United States Patent [19]

Kishi et al.

[11] 4,050,001
[45] Sept. 20, 1977

[54] EDIT CIRCUIT FOR A NUMERICAL CONTROL SYSTEM

[75] Inventors: Hajimu Kishi; Masashi Takahashi, both of Tokyo, Japan

[73] Assignee: Oki Electric Industry Co., Ltd., Tokyo, Japan

[21] Appl. No.: 647,208

[22] Filed: Jan. 7, 1976

[30] Foreign Application Priority Data

Jan. 20, 1975 Japan .................................. 50-7713

[51] Int. Cl.² ............................................ G05B 11/32
[52] U.S. Cl. .............................. 318/625; 235/151.11; 90/15 R; 317/562
[58] Field of Search ............... 318/573, 574, 562, 625; 90/15 R; 235/151.11

[56] References Cited

U.S. PATENT DOCUMENTS

| | | | |
|---|---|---|---|
| 2,899,869 | 8/1959 | Daugherty | 90/16 |
| 2,983,199 | 5/1961 | Daugherty | 90/15 |
| 3,739,157 | 6/1973 | Bobrowicz et al. | 235/151.11 |
| 3,857,026 | 12/1974 | Mous | 235/151.11 |

Primary Examiner—Robert K. Schaefer
Assistant Examiner—John J. Feldhaus
Attorney, Agent, or Firm—Kenyon & Kenyon

[57] ABSTRACT

An edit circuit for a numerical control system, in which a plurality of series of input data having a common control data are edited into a single series of data. Said circuit comprises a plurality of input means receiving input data corresponding to different objects being controlled, respectively, a plurality of A-registers storing the data from the input means, a comparator circuit comparing the data stored in the A-registers, a plurality of arithmetic circuits operating on the data in the A-registers based on the result of comparison at the comparator circuit, and a B-register combining the operated data from the arithmetic circuits into one series of data for storage therein.

2 Claims, 4 Drawing Figures

EDIT CIRCUIT FOR A NUMERICAL CONTROL SYSTEM

BACKGROUND OF THE INVENTION

This invention relates to a numerical control system which edits a plurality of series of input data into one series of data, so as to simultaneously control a plurality of objects having a common control axis.

Conventionally, in order to numerically control a plurality of objects, a plurality of numerical control devices are used. This conventional method of using a plurality of numerical control devices has a shortcoming in that the overall cost becomes high and that, if the plurality of objects being controlled has a common control axis, it becomes necessary to exchange timing signals for synchronizing each of the numerical control devices, which signal exchange for synchronization is technically cumbersome.

SUMMARY OF THE INVENTION

The present invention mitigates the aforesaid difficulties of the conventional numerical control devices, by providing an edit circuit for a numerical control device with a plurality of input means and an editing function of editing a plurality of series of input data into one series of data, so that a plurality of objects can be controlled simultaneously by the one numerical control device. The present edit circuit comprises a plurality of input means receiving input data corresponding to said objects, respectively, a plurality of A-registers storing the data from the input means, a comparator circuit comparing the data stored in the A-registers, a plurality of arithmetic circuits operating on the data in the A-registers based on the result of comparison at the comparator circuit, and a B-register combining the operated data from the arithmetic circuits into one series of data for storage therein.

BRIEF DESCRIPTION OF THE DRAWINGS

The foregoing and other objects, features and attendant advantages of the invention will be appreciated as the same become better understood from the following description with reference to the accompanying drawings wherein.

DESCRIPTION OF THE PREFERRED EMBODIMENT

Figure 1:
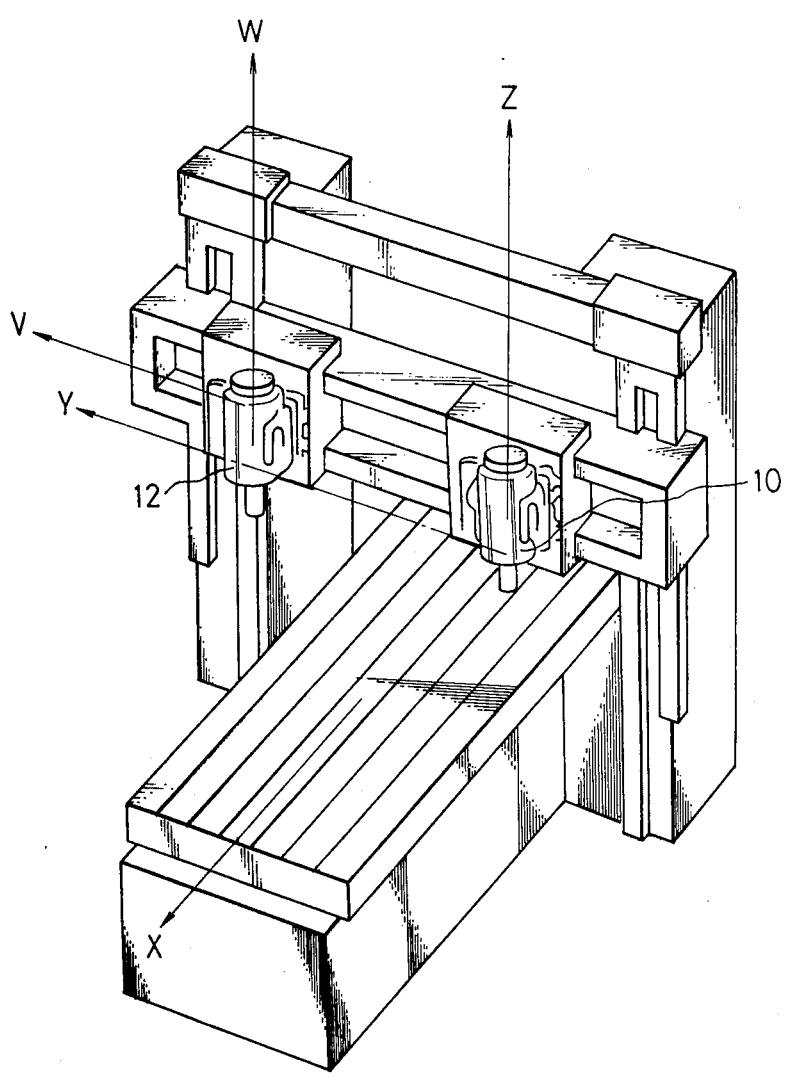
FIG. 1 is a schematic perspective view of a two-headed gate-type milling machine to which the numerical control system according to the present invention can be applied.

FIG. 1 is a schematic perspective view of a two-headed gate-type milling machine which is controlled by the numerical control system, according to the present invention. The two heads 10 and 12 of the milling machine are controlled along a three-axis coordinate X, Y, Z and another three-axis coordinate X, V, W, respectively. Thus, the two heads represent two objects being controlled, which objects have one common control axis, i.e., the X-axis. One of the applications of the milling machine in FIG. 1 is the cutting of a wing of an air-plane, in which accurate symmetrical cutting is desired. The two heads 10 and 12 must operate in a synchronized condition to each other.

Figure 2A:
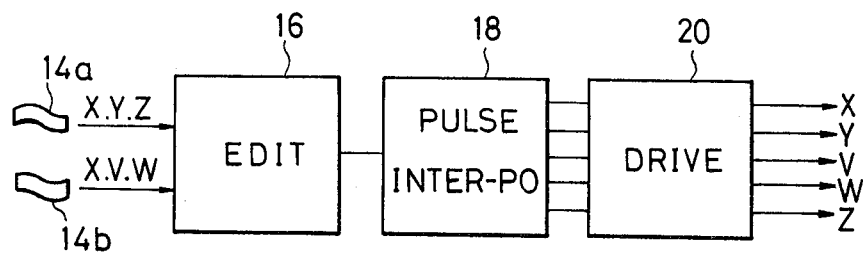
FIG. 2(A) and FIG. 2(B) are block diagrams of an embodiment of the numerical control system according to the present invention.

FIG. 2(A) is a brief block-diagram of a numerical control system of the present invention. In FIG. 2(A), a first paper tape 14a provides the data X, Y, Z concerning the movement of the first head 10, and a second paper tape 14b provides the data X, V, W concerning the movement of the second head 12. Thus, the two heads 10 and 12 have a common axis X. These data X, Y, Z and X, V, W are applied to an edit circuit 16, in which these data are edited into a single series of data X, Y, V, W, Z. The edited data, X, Y, V, W, Z is applied to a conventional pulse interpolation circuit 18, in which interpolation pulses for each of the axes are obtained. The interpolation pulses are applied to each of the corresponding axes X, Y, V, W, Z, respectively, through a conventional drive circuit 20.

Figure 2B:
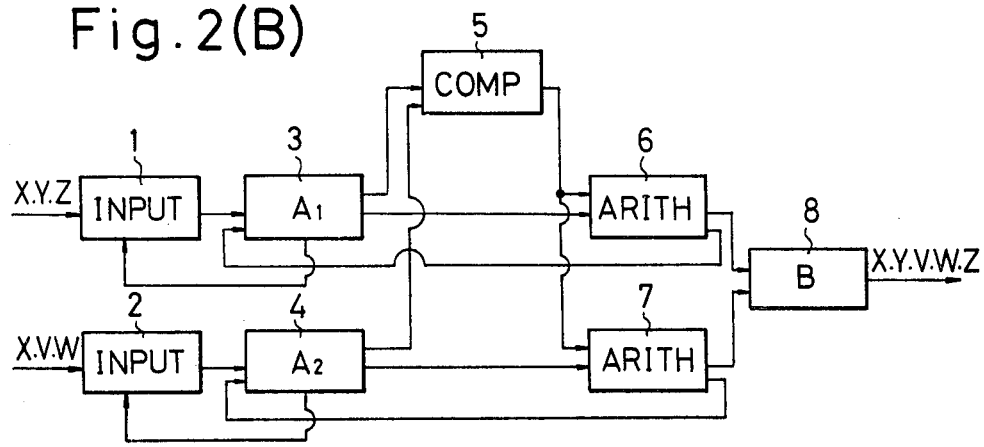

FIG. 2(B) is a block diagram of an embodiment of the edit circuit 16 in FIG. 2(A). In the figure, 1 and 2 are two input means receiving input data; 3 and 4 are two A-registers storing data received by the input means 1, 2, respectively; 5 is a comparator circuit comparing the data stored in the A-registers, 6 and 7 are two arithmetic circuits operating on the data stored in the A-registers 3, 4 based on the outcome of the comparison at the circuit 5, and; 8 is a B-register combining the data operated by said operating circuits 6, 7 into one series of data for storing therein.

Figure 3:
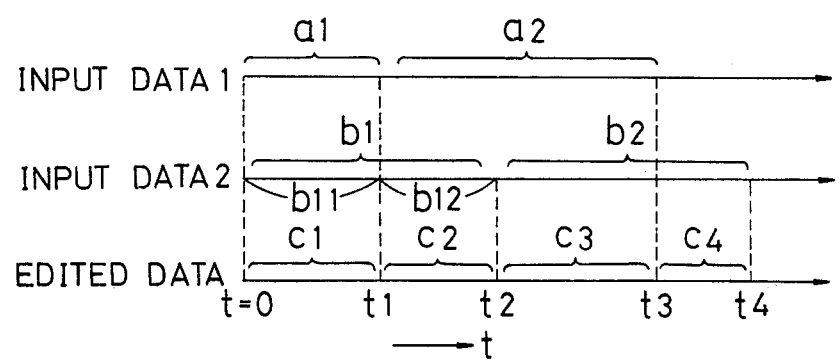
FIG. 3 is a timing chart of two input data and an edited series of data, in terms of the control timing in a common control axis, i.e., X-axis.

FIG. 3 is a graph whose abscissa represents time, which graph illustrates the timing of editing two series of X-axis input data into one series of X-axis edited data. In FIG. 3, the two series of input data have two data blocks $a_1$, $a_2$ and $b_1$, $b_2$, respectively, and the series of edited data has four data blocks $c_1$, $c_2$, $c_3$, $c_4$.

The operation of the numerical control system will now be described.

It is assumed that the input data blocks $a_1$ and $b_1$ are applied to the input means 1 and 2 and stored in the A-registers 3 and 4 at time $a=0$, respectively. The two data blocks $a_1$ (having the data, $\Delta X_1$, $\Delta Y_1$, $\Delta Z_1$) and $b_1$ (having the data $\Delta X_1$, $\Delta V_1$, $\Delta W_1$) are compared at the comparator circuit 5, so as to detect that input data block which has a shorter control time with respect to the common control axis, namely the X-axis. In the example, as shown in FIG. 3, the control time $t_1$ of the input data block $a_1$ is shorter than the control time $t_2$ of the input data block $b_1$, i.e., $t_1 < t_2$, so that the input data block $a_1$ is detected in this case.

Based on the result of the comparison at the circuit 5, the arithmetic circuits 6 and 7 divide the data blocks $a_1$ and $b_1$ into partial data having a control time $t_1$ and remainder partial data consisting of the remaining portions thereof, respectively. In the illustrated case, since the data block $a_1$ has the control time $t_1$, the arithmetic circuit 6 does not perform the division. On the other hand, the arithmetic circuit 7 divides the data block $b_1$ into two partial data blocks $b_{11}$ and $b_{12}$, as shown in FIG. 3. The partial data block $b_{11}$ has the control time $t_1$, while the control time of the partial data block $b_{12}$ is $(t_2 - t_1)$.

If axial increments to be controlled by the input data block $b_1$ and the partial data blocks $b_{11}$ and $b_{12}$ are represented by $\Delta x_1$, $\Delta v_1$, $\Delta w_1$ for $b_1$, and $\Delta x_{11}$, $\Delta v_{11}$, $\Delta w_{11}$ for $b_{11}$, and $\Delta x_{12}$, $\Delta v_{12}$, $\Delta w_{12}$ for $b_{12}$, then the following relations are satisfied.

For the partial data block $b_{11}$, $$\Delta x_{11} = \Delta x_1 \times t_1/t_2$$

$$\Delta v_{11} = \Delta v_1 \times t_1/t_2$$

$$\Delta w_{11} = \Delta w_1 \times t_1/t_2$$

For the partial data block $b_{12}$, $$\Delta x_{12} = \Delta x_1 - \Delta x_{11}$$

$$\Delta v_{12} = \Delta v_1 - \Delta y_{11}$$

$$\Delta w_{12} = \Delta w_1 - \Delta w_{11}$$

If the X-axis increment to be controlled by the input data block $a_1$ is represented by $\Delta x_a$, the relation of $\Delta x_a = \Delta x_{11}$ is satisfied, because both of the increments $\Delta x_a$ and $\Delta x_{11}$ have the same control time $t_1$.

Based on the operation at the arithmetic circuits 6 and 7, and edited data block $c_1$ is at first stored in the B-register 8, which data block $c_1$ includes axial increments $\Delta X_1$, $\Delta Y_1$, $\Delta Z_1$ of the data block $a_1$ from the arithmetic circuit 6, and the V-axis increment $\Delta v_{11}$ and the W-axis increment $\Delta w_{11}$ of the data block $b_{11}$ from the arithmetic circuit 7. The data block $c_1$ thus stored in the B-register 8, which data block includes the increments in the directions of the X-, Y-, Z-, V-, and W-axes, is used as one series of data for simultaneously controlling the two heads 10 and 12 of the milling machine, as shown in FIG. 1. The partial data block $b_{12}$, which is generated by the division in the arithmetic circuit 7, is returned to the A-register 4. On the other hand, the data block $a_1$ stored in the A-register 3 has been fully processed, so that the input means 1 receives an input timing signal which instructs the reading of the next input data block $a_2$. In response to this input timing signal, the input means 1 reads the input data block $a_2$ for delivering the data block $a_2$ to the A-register 3. The data blocks $a_2$ and $b_{12}$ thus stored in the A-registers 3 and 4 are then compared at the comparator circuit 5, for processing in a manner similar to that as described above, so as to store the edited data block $c_2$ in the B-register 8, as shown in FIG. 3. Similar processes are repeated, so as to generate edited data blocks $c_3$ and $c_4$ in serial succession.

Although the present invention has been described by referring to an embodiment controlling two objects, the present invention is not restricted to such an embodiment, and it can be applied to numerical control of an arbitrary number of objects having one common control axis for controlling those objects simultaneously, too.

As is apparent from the foregoing disclosure, the numerical control system according to the present invention includes a plurality of input means and a means editing a plurality of series of data into one series of data, so that the numerical control system enables one numerical control device to simultaneously control a plurality of objects.

From the foregoing it will now be apparent that a new and improved numerical control system has been found. It should be understood, of course, that the embodiment disclosed is only illustrative and is not intended to limit the scope of the invention. Reference should be made to the appended claims, therefore, rather than the specification as indicating the scope of the invention.

What is claimed is:

1. An edit circuit for a numerical control system for a plurality of objects being controlled, which objects have one common control axis, characterized in that said circuit comprises a plurality of input means receiving input data corresponding to said objects, respectively, a plurality of A-registers storing the data from the input means, a comparator circuit comparing the data stored in the A-registers, a plurality of arithmetic circuits operating on the data in the A-registers based on the result of comparison at the comparator circuit, and a B-register combining the operated data from the arithmetic circuits into one series of data for storage therein, said input means receiving input data in response to input timing signals from the corresponding A-registers, said input timing signals being generated when each A-register becomes empty, said data delivered to each of said A-registers being compared at said comparator circuit so as to find a datum having the shortest control time $t_1$ relating to said common control axis among the data being compared at one time, each of said arithmetic circuits dividing the data in the corresponding A-register into partial data to be controlled in the control time $t_1$ and another partial datum consisting of the remainder thereof based on the outcome from the comparison, said B-register storing those partial data from said arithmetic circuits which have the control time $t_1$ as one datum, said other partial data being returned to the corresponding A-registers, respectively, said objects being controlled simultaneously by said one datum stored in said B-register.

2. An edit circuit for a numerical control system according to claim 1, which the number of said objects being controlled is two.

* * * * *